(12) United States Patent
Allyn

(10) Patent No.: US 10,675,689 B2
(45) Date of Patent: Jun. 9, 2020

(54) METAL LATHE AND TOOLING CALIBRATION

(71) Applicant: MacKay Manufacturing, Inc., Spokane Valley, WA (US)

(72) Inventor: Thomas Allyn, Spokane Valley, WA (US)

(73) Assignee: MacKay Manufacturing, Inc., Spokane Valley, WA (US)

( * ) Notice: Subject to any disclaimer, the term of this patent is extended or adjusted under 35 U.S.C. 154(b) by 88 days.

(21) Appl. No.: 15/799,718

(22) Filed: Oct. 31, 2017

(65) Prior Publication Data

US 2019/0126357 A1 May 2, 2019

(51) Int. Cl.
| | | |
|---|---|---|
| *B32B 7/04* | (2019.01) | |
| *G05B 19/401* | (2006.01) | |
| *B23Q 15/24* | (2006.01) | |
| *B23Q 17/20* | (2006.01) | |
| *B23B 7/04* | (2006.01) | |
| *B23B 29/32* | (2006.01) | |

(52) U.S. Cl.
CPC ............... *B23B 7/04* (2013.01); *B23B 29/32* (2013.01); *B23Q 15/24* (2013.01); *G05B 19/401* (2013.01); *B23B 2260/128* (2013.01); *B23B 2270/48* (2013.01); *G05B 2219/50139* (2013.01)

(58) Field of Classification Search
CPC ..... B23B 7/04; B23B 29/32; B23B 2260/128; B23B 2270/48; B23Q 17/20; B23Q 17/22; B23Q 15/22; B23Q 15/18; B23Q 15/16; B23Q 15/24; G05B 19/401; G05B 2219/50139
See application file for complete search history.

(56) References Cited

U.S. PATENT DOCUMENTS

| | | | | |
|---|---|---|---|---|
| 4,554,495 A | * | 11/1985 | Davis | G05B 19/4015 318/572 |
| 4,608,763 A | * | 9/1986 | Manns | B23Q 1/0009 33/561 |
| 4,774,753 A | * | 10/1988 | Holy | B23Q 17/20 33/504 |
| 4,779,319 A | * | 10/1988 | Juengel | B23Q 1/0009 29/57 |
| 5,239,479 A | * | 8/1993 | Nolting | B23Q 17/006 700/174 |
| 5,513,113 A | * | 4/1996 | Okada | G05B 19/404 700/179 |
| 6,161,055 A | * | 12/2000 | Pryor | G05B 19/4065 382/152 |

(Continued)

FOREIGN PATENT DOCUMENTS

| | | | | |
|---|---|---|---|---|
| EP | 1777033 A1 | * | 4/2007 | ............ B23Q 11/08 |
| JP | 63232960 A | * | 9/1988 | ............ B23Q 15/04 |

*Primary Examiner* — Sara Addisu

(74) *Attorney, Agent, or Firm* — Lee & Hayes, P.C.

(57) ABSTRACT

Systems and methods for lathe and tooling calibration are disclosed. A sensor is utilized to measure dimensions and operational parameters of one or more components of a lathe, such as a turret, tool stations, and/or a spindle. Tool measurements are received and analyzed along with the measurements from the sensor. The dimensions and operational parameters may be utilized to calibrate movement parameters of one or more components of the lathe. Once calibrated, the lathe may be utilized to tool one or more objects.

11 Claims, 7 Drawing Sheets

(56) References Cited

U.S. PATENT DOCUMENTS

| | | | |
|---|---|---|---|
| 6,884,204 B2* | 4/2005 | Watanabe | B23Q 3/183 |
| | | | 409/133 |
| 7,676,945 B2* | 3/2010 | Prestidge | G01B 5/012 |
| | | | 33/559 |
| 8,152,422 B2* | 4/2012 | Bretschneider | G05B 19/404 |
| | | | 409/193 |
| 9,186,738 B2* | 11/2015 | Mall | B23F 23/04 |
| 2002/0129681 A1* | 9/2002 | Ono | G05B 19/404 |
| | | | 82/1.11 |
| 2006/0037443 A1* | 2/2006 | D'Antonio | B23Q 17/22 |
| | | | 82/159 |
| 2009/0133545 A1* | 5/2009 | Tanaka | B23Q 17/20 |
| | | | 82/121 |

* cited by examiner

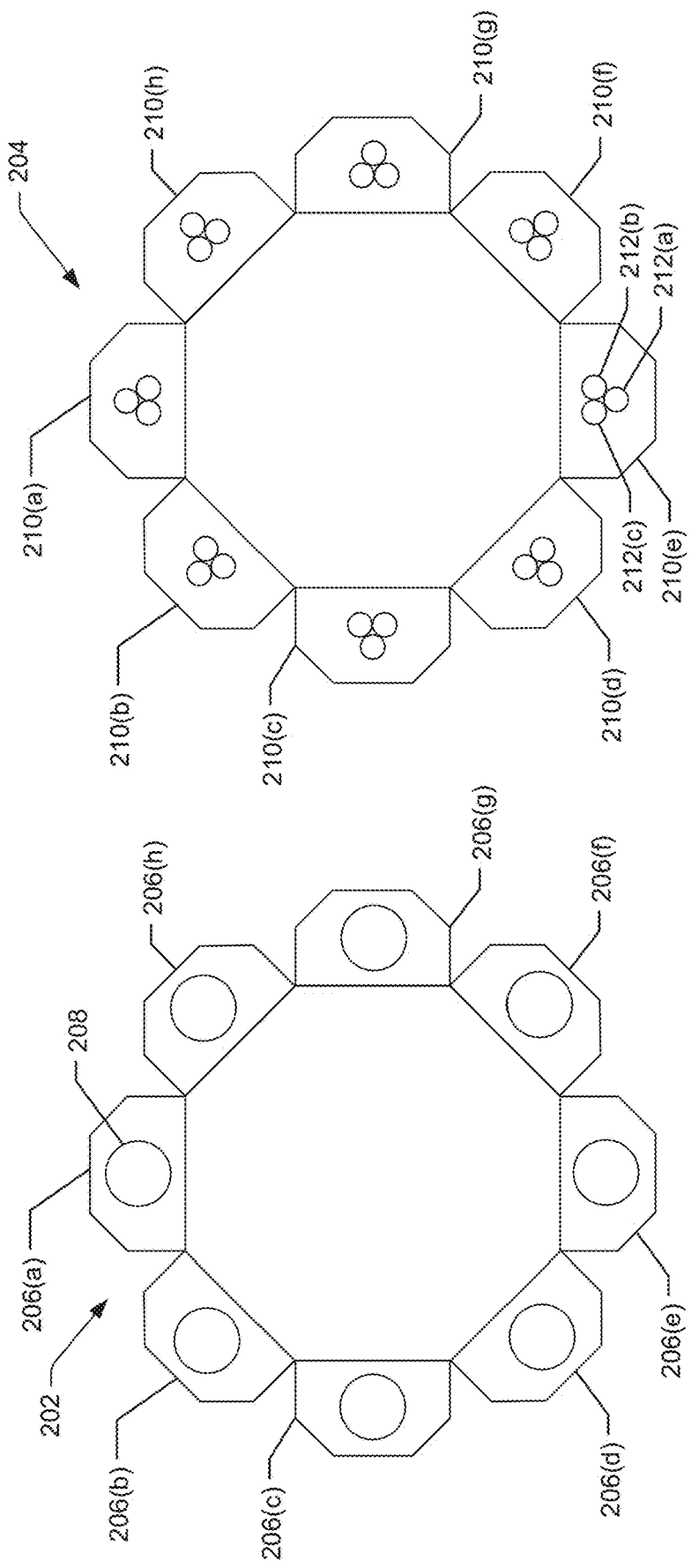

METAL LATHE AND TOOLING CALIBRATION

BACKGROUND

Components composed of metal may be shaped by a metalworking lathe. Multiple tools may be needed to shape a given component, and the dimensions of the tools as well as the operating parameters of the metalworking lathe are calibrated prior to shaping the component. This calibration process is time and labor-intensive, leading to decreased productivity and making the process error prone.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 2A illustrates an example turret of a lathe having multiple tool stations.

FIG. 2B illustrates another example turret of a lathe having multiple tool stations, with the tool stations configured to receive multiple tools.

DETAILED DESCRIPTION

Figure 1:
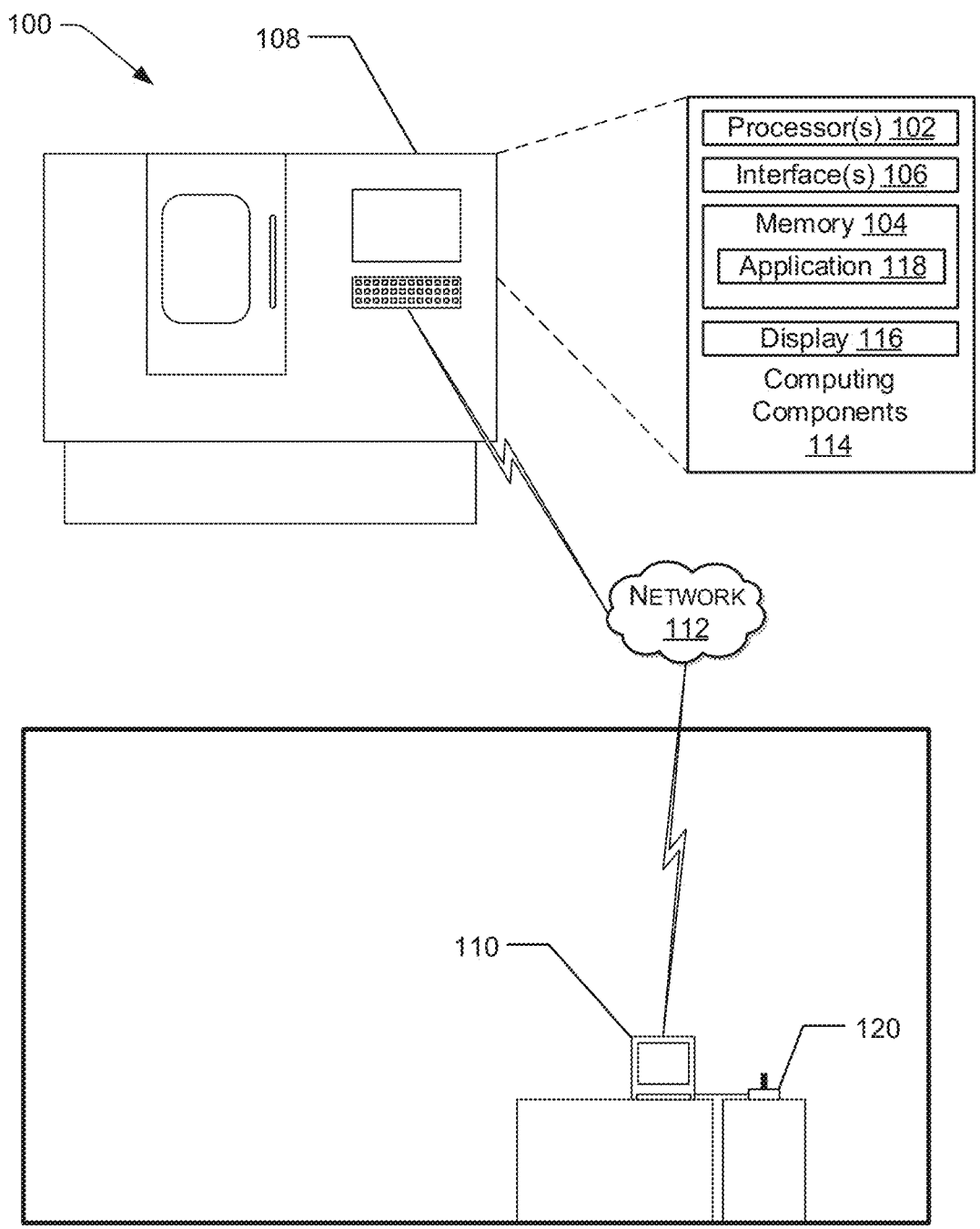
FIG. 1 illustrates a schematic diagram of an example system for metal lathe and tooling calibration.

Metal lathing systems and methods for calibrating such systems for tooling of parts are described herein. Components that are composed of metal may be shaped by a metalworking lathe, also described as a metal lathe or a lathe. The component, which may be referred to as bar stock, is held by a spindle of the lathe. The spindle may rotate while a tool is made to contact the bar stock at a given location. Additionally, or alternatively, the tool may rotate. The tool may cut away a portion of the bar stock until a desired shape of the bar stock is achieved. In many applications, it is necessary to utilize multiple tools to make differing cuts to the bar stock. Some lathes include a turret that has one or more tool stations to which tools may be coupled. The turret may rotate to bring the various tools into contact with the bar stock and/or the turret may move the tools toward and away from the bar stock. The various tools are used to shape the bar stock, typically in a prescribed order, until the finished component is completed.

Components shaped by a metal lathe are often required to be precisely shaped, with error tolerances in the micrometer range. To achieve such precision, calibration of the lathe is required before shaping the bar stock. Generally, the tools to shape a given component are chosen from a library of tools, which may be kept in a tool room or other environment for storage. A technician, having received an indication of the chosen tools, may retrieve the chosen tools from the library of tools. One or more dimensions of the tools are then measured to determine an operating distance of the cutting surface of the tool with respect to a tool station. These measurements are recorded by the technician, typically by pen and paper or a computer printout.

Additionally, operational parameters of components of the lathe must also be calibrated. For example, measurements related to the position of the turret, the position of the tool stations, the rotation of components of the spindle, and/or the rotation of components of the tool stations are taken. While the measurements of the tools by the technician may be performed in a matter of minutes with an optical measuring device, the lathe-related measurements are more time-intensive and generally require a highly-skilled individual to obtain. Generally, for a lathe having multiple tool stations, the lathe-related measurement may take approximately 3 to 4 hours to complete. These lathe-related measurements must be retaken periodically given the ordinary wear and tear on the lathe.

Once calibration of the lathe and tools has been performed, the tools are loaded into the tool stations of the turret in a given order, the operator of the lathe then manually enters the tool dimensions and attempts to compensate for the lathe-related measurements. This process generally involves the operator manually touching off each of the tools to the bar stock and recording the x-axis and z-axis position of the turret and/or spindle. This, too, is a time-intensive process.

To alleviate the problems with lathe calibration described above, systems and methods are disclosed that eliminate the need for the lathe operator to utilize the lathe-related measurements before starting a job and that eliminate the need for each tool to be touched off. Also, for subsequent jobs, a single tool may be touched off but the rest of the tools need not be touched off. For example, the system may include one or more computer-readable media storing computer-executable instructions that, when executed by one or more processors, may cause the one or more processors to perform one or more operations. The operations may include receiving, from a sensor disposed adjacent to a turret of a metalworking lathe, first measurements including first dimensions of one or more tool stations of the turret and parameters of operation of the one or more tool stations. The sensor may be a tooling ball that may be moved into proximity of various components of the lathe to measure the components and/or parameters of their operation. The first measurements may be stored, such as in a database local to the lathe.

Second measurements may be received that include second dimensions of at least one tool configured to be removably coupled to the one or more tool stations. These measurements may be manually entered into a user interface associated with the lathe, or the measurements may be received via a wired or wireless network, described more fully with respect to FIG. 1, from a system remote to the lathe. Movement parameters of the turret and/or the at least one tool may be calibrated based at least in part on the first measurements and the second measurements. At this point, the lathe is calibrated to shape a bar stock and the lathe operator is not required to adjust movement parameters based on lathe-related measurements and the operator is not required to touch off each of the tools prior to operating the lathe. The operations may also include causing the at least one tool to cut an object composed of metal based at least in part on the movement parameters of the turret and the movement parameters of the tool(s).

For subsequent cutting jobs, the measurement of the tools specific to the job may be received and calibration of the lathe may be performed automatically based at least in part on the first measurements, and, as with the previous example, the lathe operator is not required to adjust movement parameters based on the lathe-related measurements. For subsequent tooling jobs the lathe operator may touch off a single tool prior to operating the lathe, and the movement parameters may calibrate the lathe to perform the desired tooling. In this way, the lathe operator is not required to touch off each tool prior to operating the lathe, as is typically required in the art.

The systems described herein may provide a range of additional, or alternative, functionalities to users. These functionalities may include periodically receiving updated measurements and recalibrating the movement parameters of the turret and/or tool stations based at least in part on the updated measurements. The functionalities may additionally, or alternatively, include assigning a given tool station as a reference station and designating dimensions and/or movement parameters of the tool station as reference data that may be utilized during calibration of the lathe. The functionalities may additionally, or alternatively, include presenting, on a screen associated with the lathe, a prompt to confirm initiation of operation of the lathe without requesting additional information or input from a user.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example system 100 for lathe calibration. System 100 may include one or more processors. As used herein, a processor, such as processor(s) 102, may include multiple processors and/or a processor having multiple cores. Further, the processors 102 may comprise one or more cores of different types. For example, the processors 102 may include application processor units, graphic processing units, and so forth. In one implementation, the processor 102 may comprise a microcontroller and/or a microprocessor. The processor(s) 102 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, the processor(s) 102 may possess their own local memory, which also may store program components, program data, and/or one or more operating systems.

System 100 may also include memory 104. Memory 104 may include volatile and nonvolatile memory, removable and non-removable media implemented in any method or technology for storage of information, such as computer-readable instructions, data structures, program component, or other data. Such memory 104 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 104 may be implemented as computer-readable storage media ("CRSM"), which may be any available physical media accessible by the processor(s) 102 to execute instructions stored on the memory 104. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 104, discussed herein may include at least one operating system (OS) component that is configured to manage hardware resource devices such as the network interface(s), the I/O devices of the respective apparatuses, and so forth, and provide various services to applications or components executing on the processors.

Each of the network interface(s) 106 may enable communications between a lathe 108 and a remote system 110, as well as other networked devices. Such network interface(s) 106 can include one or more network interface controllers (NICs) or other types of transceiver devices to send and receive communications over a network.

For instance, the network interface(s) 106 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 106 may include a wide area network (WAN) component to enable communication over a wide area network. The network 112 may represent an array of wired networks, wireless networks, such as WiFi, or combinations thereof.

In some instances, the remote system 110 may be local to an environment associated the lathe 108. In other examples, the remote system 110 may be disposed in a different environment from the environment wherein the lathe 108 is disposed. In these examples, the remote system 110 may be disposed in a tooling room or other environment designated at least in part as housing a library of tools to be used in the lathe 108. In examples where the remote system 110 is situated in a tooling room, a measurement device 120, such as an optical measuring device, may be part of, or situated near, the remote system 110. The measurement device 120 may be utilized to determine the tool-related measurements.

In some instances, the lathe 108 may include one or more computing components 114, which may include the processor(s) 102, the memory 104, and/or the network interface(s) 106. The computing components 114 may additionally, or alternatively, include a display 116, which may provide a user interface to an operator of the lathe. A keyboard or other input component, such as but not limited to a touchscreen and/or a mouse, may be associated with the display 116.

Additionally, one or more applications 118 may be stored in the memory 104 and may cause the processor(s) 102 to perform one or more operations. The operations may include, for example, receiving, from a sensor disposed adjacent to a turret of a metalworking lathe, first measurements including (1) first dimensions of one or more tool stations of the turret and/or (2) parameters of operation of the one or more tool stations. The first measurements may additionally, or alternatively, include operational parameters of one or more components of a spindle of the lathe. For example, rotational distances of at least one of the face, rim, and/or bore of the spindle may be measured about a center line of the spindle. The sensor from which the measurements described herein are received may be a tooling ball. The measurements may be taken by operating the tooling ball in proximity to one or more of the components of the lathe 108.

The operations may additionally include storing, in a database local to the metalworking lathe 108, the dimensions and the parameters. The database may be a component of the memory 104 and may also be referred to as a register that stores a listing of the tool stations of the turret of the lathe 108 along with measurements corresponding to the tool stations as well as the measurements associated with the spindle. In other examples, the database may be remote from the metalworking lathe 108 and may be accessible, such as via a wired or wireless connection, by the computing components 114 of the lathe 108.

The operations may additionally include receiving second measurements including second dimensions of at least one tool configured to be removably coupled to the one or more tool stations. For example, the second measurements may be acquired by a technician who measures the at least one tool. The second measurements may be received by manual input and utilizing the display 116 of the computing components 114. In other examples, the second measurements may be received from the remote system 110 via the network 112.

The operations may additionally include calibrating the first movement parameters of the turret and second movement parameters of the tool based at least in part on the first measurements and the second measurements. The first movement parameters of the turret may include, for example, the rotation of the turret and/or the position of the turret relative to the spindle and/or bar stock. The first movement parameters may additionally, or alternatively, include the rotation of the spindle or components thereof. The second movement parameters of the tool may include, for example, the rotation of the tool and/or the position of the tool relative to the spindle and/or bar stock.

The operations may additionally include causing the tool to cut an object, such as bar stock, composed of metal based at least in part on the first movement parameters of the turret and the second movement parameters of the tool. For example, once calibrated, the lathe 108 may be enabled for cutting by, for example, a user of the lathe initiating a lathing operation. Utilizing the movement parameters described herein, the turret may rotate such that the tool to be used to cut the object is in line with the bar stock. The turret and/or the tool may also be moved from a resting position to the bar stock such that the tool comes into contact with the bar stock. Once the turret and tool are in position to cut the object, the spindle and/or the tool may begin to rotate. Rotation of the spindle and/or the tool may cause the tool to cut and/or grind away at the bar stock. Additional tools may also be used, and in these examples, when the first tool has performed the desired cut, the turret may rotate and be positioned such that a second tool is in contact with the bar stock.

FIG. 2A illustrates an example turret 202 of a lathe having multiple tool stations 206(*a*)-(*h*). As shown in FIG. 2A, eight tool stations 206(*a*)-(*h*) are disposed on the turret 202. However, it should be understood that the turret 202 may include any number of tool stations, including more than eight or less than eight. Each of the tool stations 206(*a*)-(*h*) may be utilized to hold a tool, such as for lathing a metal object. At least a portion of a tool may be inserted into the tool station. The portion of the tool that is inserted into an opening 208 of the tool station may be sized to be received by the tool station. For example, when the tool station is configured with a circular opening, such as shown in FIG. 2A, the portion of the tool receiving by the tool station may also be circular. The tool may have approximately the same shape as the tool station such that the tool, when inserted into the opening of the tool station, may fit snuggly into the tool station. One or more attachment means may be disposed on the tool and/or the tool station to hold the tool in place during operation of the lathe. The attachment means may be, for example, a clasp, a screw, a male/female groove, or other fasteners. The tool may additionally, or alternatively, be configured to screw into the tooling station. It should be understood that while the openings 208 of the tool stations 206(*a*)-(*h*) are depicted as circular in FIG. 2A, other opening shapes may be utilized.

One or more of the tool stations 206(*a*)-(*h*) may be permanently affixed to the turret 202 or the tool stations 206(*a*)-(*h*) may be removeable and/or interchangeable. In other examples, the turret 202, when manufactured, may be made to include the tool stations 206(*a*)-(*h*) such that tool stations 206(*a*)-(*h*) are components of the turret 202.

FIG. 2B illustrates another example turret 204 of a lathe having multiple tool stations, with the tool stations configured to receive multiple tools. The turret 204 may include the same or similar components as turret 202 from FIG. 2A, such as, for example, tool stations 210(*a*)-(*h*). However, unlike FIG. 2A, one or more of the tool stations 210(*a*)-(*h*) of the turret 204 may include multiple openings 212(*a*)-(*c*). One or more of the openings 212(*a*)-(*c*) may be sized to receive a tool. In the example shown in FIG. 2B, each tool station 210(*a*)-(*h*) is depicted as having three openings 212(*a*)-(*c*). However, it should be understood that the tool stations 210(*a*)-(*h*) may have differing numbers of openings. For example, tool station 210(*a*) may have one opening while tool station 210(*b*) may have two, three, four, or more tool stations. One or more of the tool stations 210(*a*)-(*h*) may be permanently affixed to the turret 204 or the tool stations 210(*a*)-(*h*) may be removeable and/or interchangeable. In other examples, the turret 204, when manufactured, may be made to include the tool stations 210(*a*)-(*h*) such that tool stations 210(*a*)-(*h*) are components of the turret 204.

Figure 3:
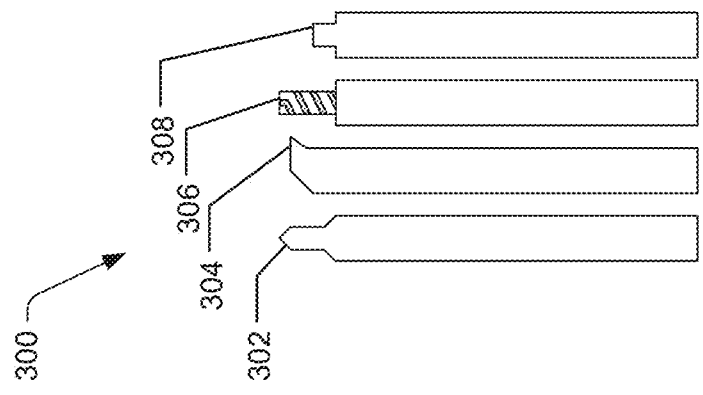
FIG. 3 illustrates example tools that may be received by the tool stations of the lathe.

FIG. 3 illustrates example tools 300 that may be received by the tool stations of the lathe. The tools 300 may be configured in a number of shapes and/or sizes. The shapes and/or sizes of the tools 300 may allow for differing cuts to be made in bar stock. For example, tool 302 may be utilized to cut a small hole or divot in bar stock. Tool 304, for example, may be utilized to cut an exterior surface of bar stock. Tool 306, for example, may be utilized to drill a portion of bar stock. Tool 308, for example, may be utilized to bore an interior portion of bar stock. Additional, or alternative, tools 300 may be removably coupled to tool stations of the turret for cutting of a metal object.

Figure 4:
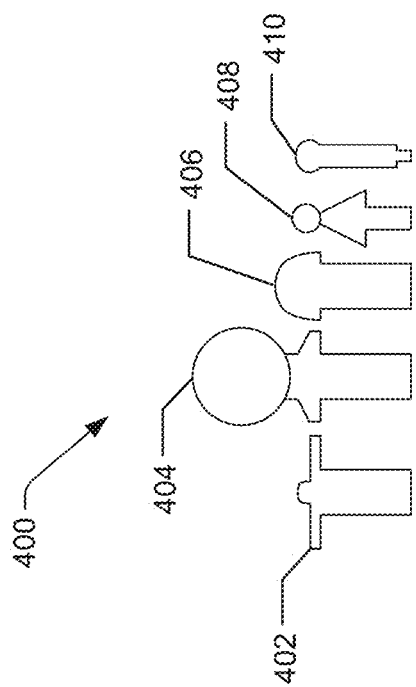
FIG. 4 illustrates example sensors for measuring components of a lathe.

FIG. 4 illustrates example sensors 400 for measuring components of a lathe. The sensors 400 may be utilized to determine one or more operational parameters and/or measurements of components of the lathe. The components of the lathe that may be measured by the sensors 400 may include the dimensions of the turret, the tool stations, the tool station openings, the rotation of the turret, the rotation of tools coupled to the tool stations, the spindle, and/or components of the spindle.

For example, a rotational distance of at least one of the face, rim, and/or bore of the spindle may be measured about a center line of the spindle. The sensors 400 from which the measurements described herein are received may be a tooling ball. The measurements may be taken by operating the tooling ball in proximity to one or more of the components of the lathe. The sensors 400 may have various sizes and/or configurations. For example, sensor 402 may have a relatively small head piece for measuring characteristics of a similarly-sized component of the lathe. Sensor 404 may have a relatively large head piece for measuring characteristics of larger components of the lathe. Other sensors, such as sensors 406-410 may have differing configuration from sensors 402-404, such as differing head shapes and/or sizes. In examples, a specific sensor may be configured to measure a specific component of the lathe. In other examples, a specific sensor may be configured to measure multiple components of the lathe. It should be appreciated that the shapes, sizes, and configurations of the sensors 400 shown in FIG. 4 are by way of illustration only. The sensors may have any shape, size, and/or configuration needed to measure dimensions and/or parameters of components of a lathe.

Figure 5:
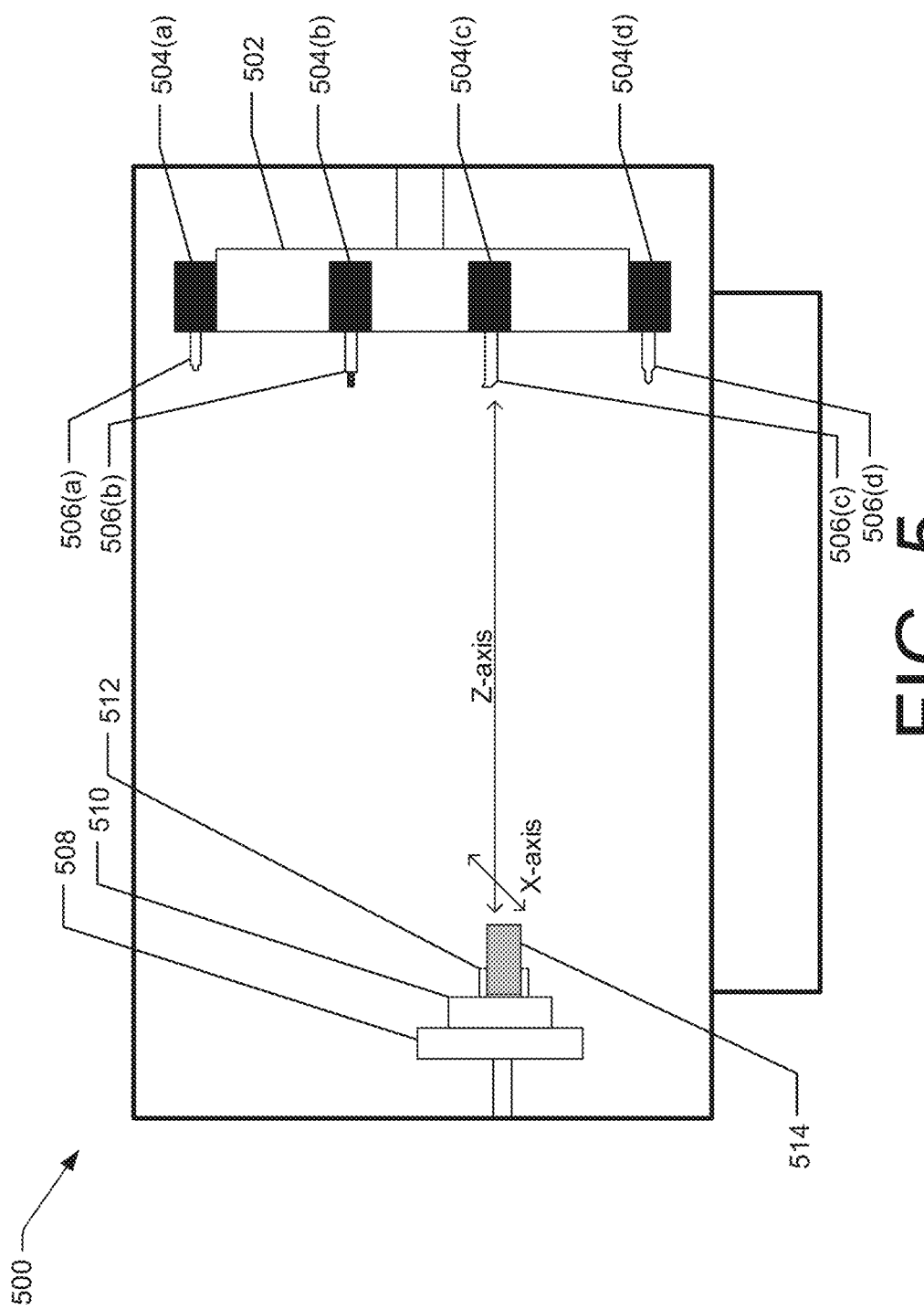
FIG. 5 illustrates a schematic diagram of an example lathe.

FIG. 5 illustrates a schematic diagram of an example lathe 500. The lathe 500 may include a turret 502. The turret 502 may include the same or similar features as the turret 202 from FIG. 2A. For example, the turret 502 may include one or more tool stations 504(*a*)-(*d*). The tool stations 504(*a*)-(*d*) may be removably coupled to the turret 502 and may be sized and configured to receive one or more tools 506(*a*)-(*d*), such as tools 302-308 as shown with respect to FIG. 3. The turret 502 may be configured to rotate about a center axis of the turret 502, and in so doing, the turret 502 may move the tools 506(*a*)-(*d*).

The lathe 500 may additionally include a spindle 508. The spindle 508 may include a face 510 and a rim 512. The rim 512 and/or the face 510 may include an opening, which may be described as the bore, that may be configured to receive a metal object 514, such as bar stock, for cutting. The turret 502 and/or the spindle 508 may be configured to move within the lathe 500. For example, the turret 502 and/or the spindle 508 may be configured to move toward and/or away from each other on the z-axis, as shown in FIG. 5. Additionally, the turret 502 and/or the spindle 508 may be configured to move in a leftward and/or rightward direction from each other on the x-axis. The positions and/or the parameters associated with one or more of the components of the lathe 500 may be measured and used for calibration of the lathe 500 as described herein.

Figure 6:
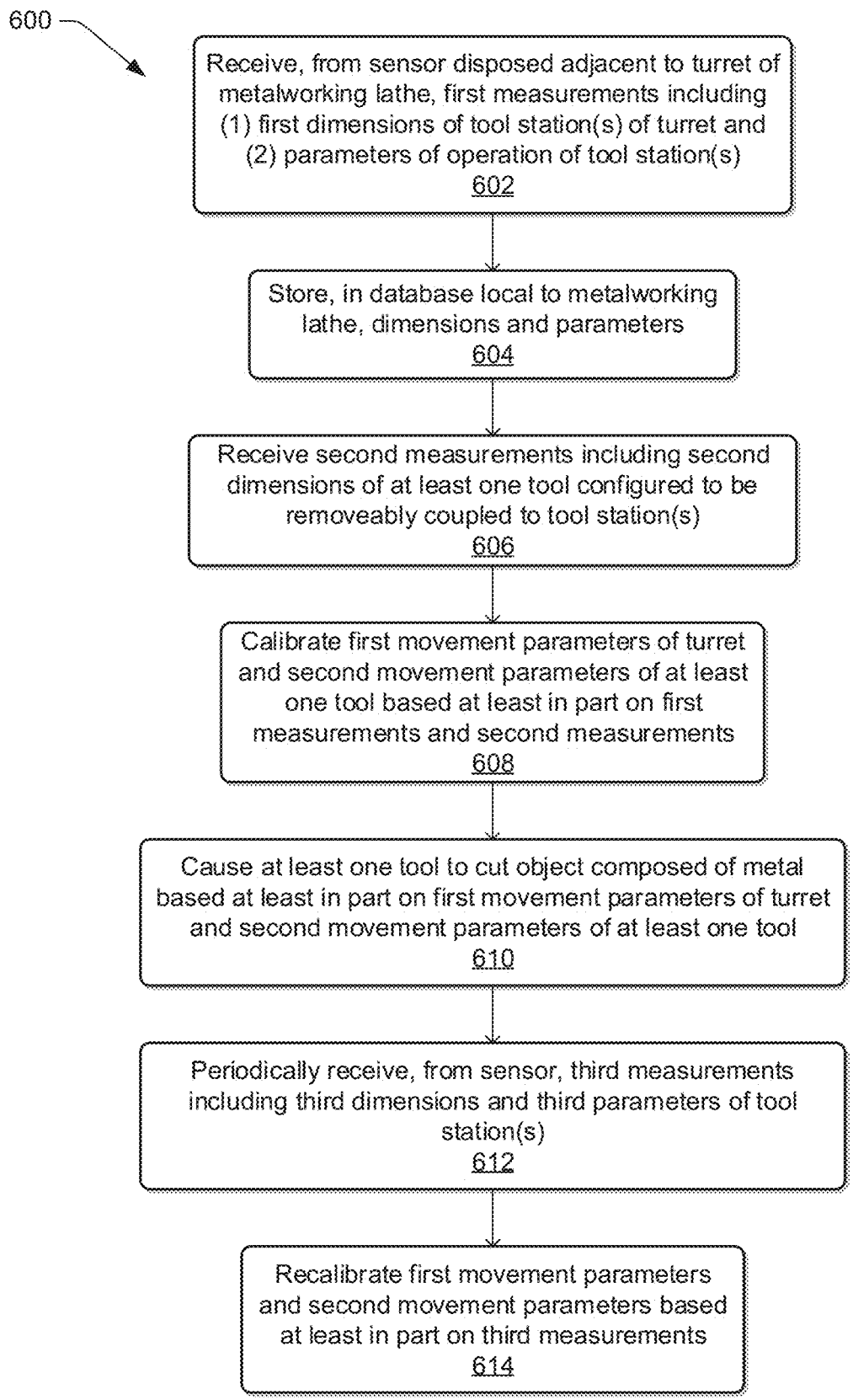
FIG. 6 illustrates a flow diagram of an example process for metal lathe and tooling calibration.
Figure 7:
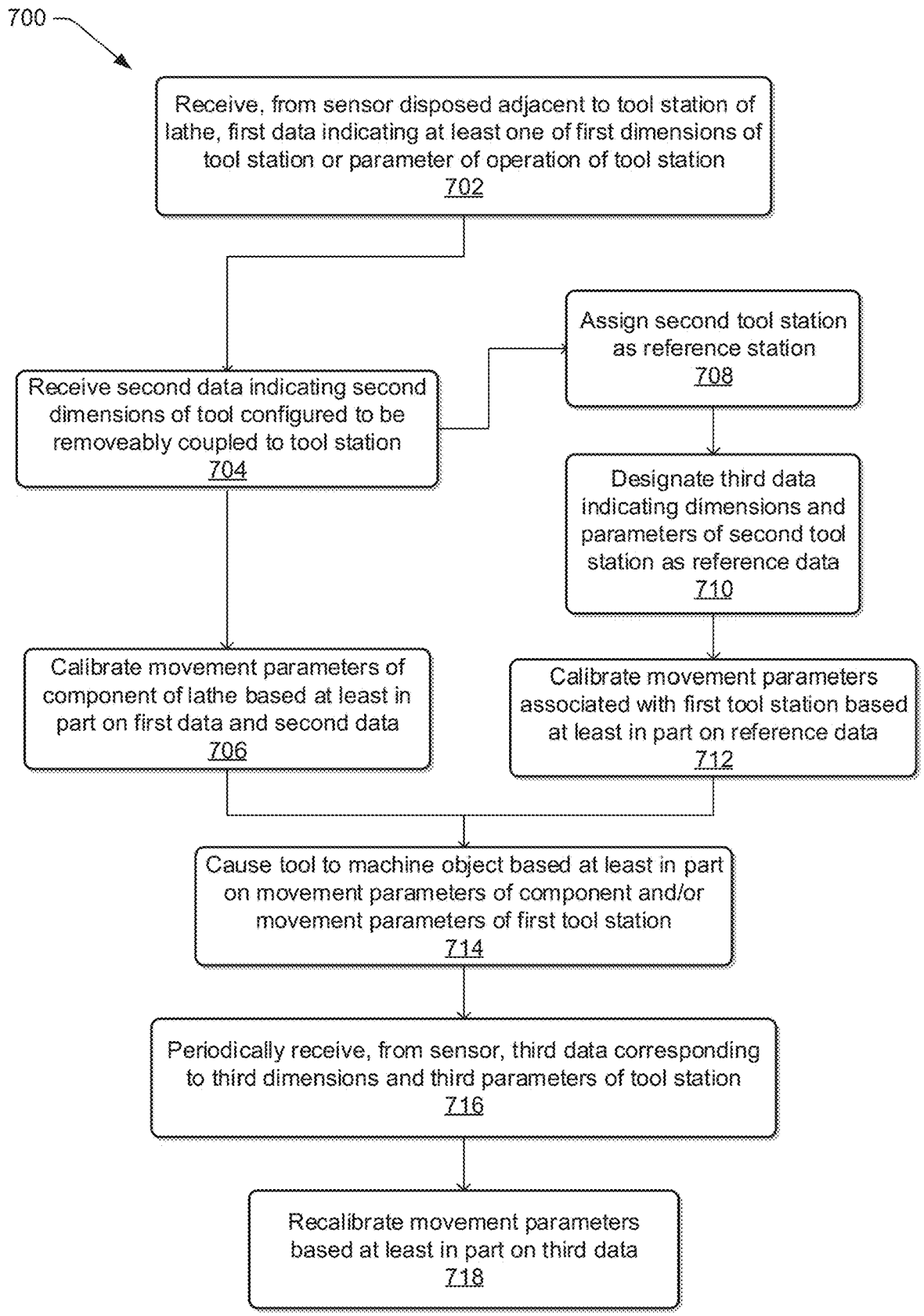
FIG. 7 illustrates a flow diagram of another example process for metal lathe and tooling calibration.
Figure 8:
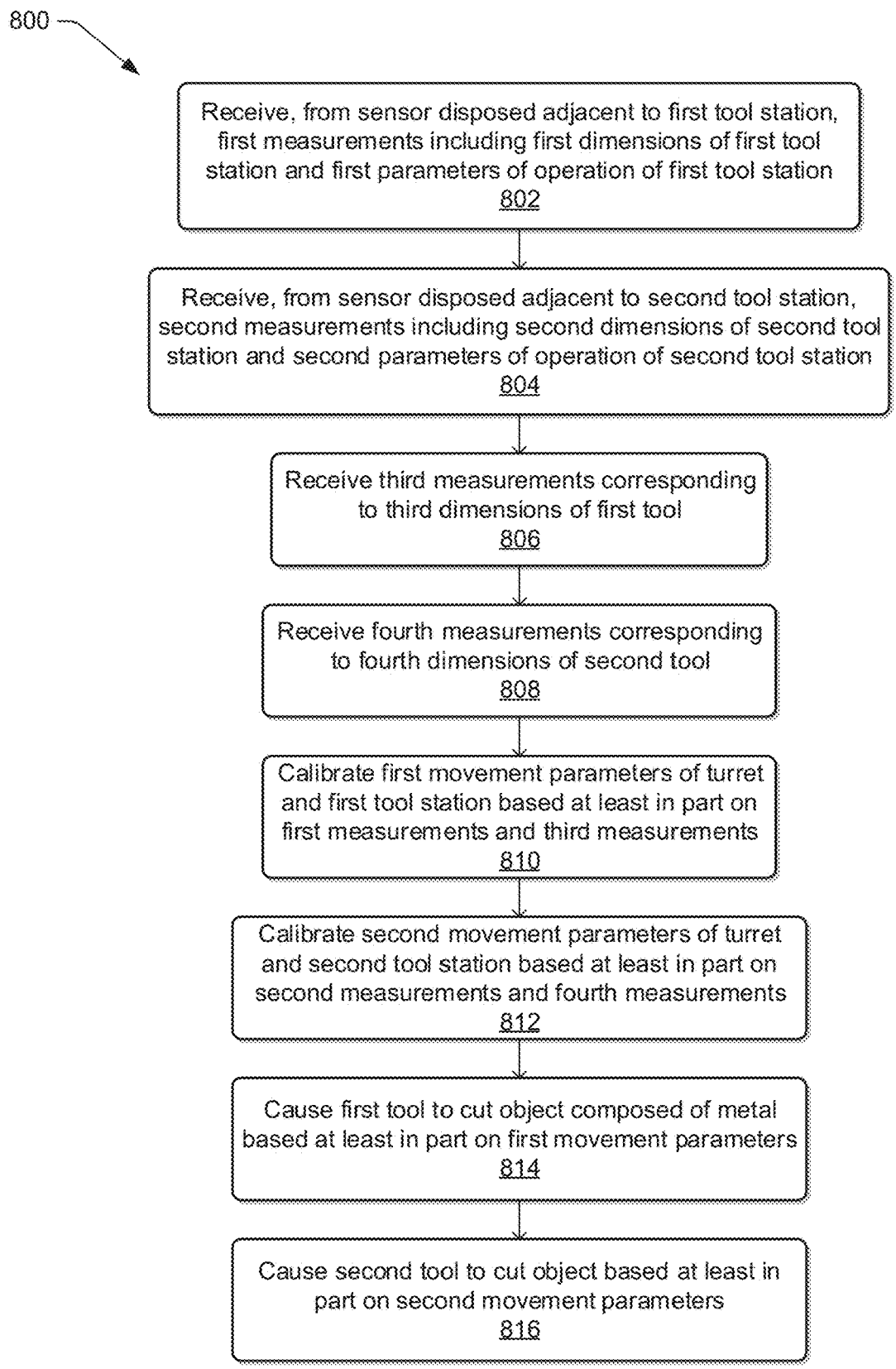
FIG. 8 illustrates a flow diagram of another example process for metal lathe and tooling calibration.

FIGS. 6-8 illustrate various processes for lathe and tooling calibration. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1-5, although the processes may be implemented in a wide variety of other environments, architectures and systems.

FIG. 6 illustrates a flow diagram of an example process 600 for metal lathe and tooling calibration. The order in which the operations or steps are described is not intended to be construed as a limitation, and any number of the described operations may be combined in any order and/or in parallel to implement process 600.

At block 602, process 600 may include receiving, from a sensor disposed adjacent to a turret of a metalworking lathe, first measurements. The first measurements may include first dimensions of one or more tool stations of the turret and/or parameters of operation of the one or more tool stations. The sensor may be, for example, a tooling ball that may be moved into proximity of various components of the lathe to measure the components and/or parameters of their operation. The first measurements may include, for example, positional and/or rotational measurements of the turret, the one or more tool stations, a spindle of the lathe, and/or components of the spindle. The tool station may be configured to hold one or more tools.

At block 604, the process 600 may include storing the dimensions and/or the parameters. In examples, the dimensions and/or the parameters may be stored in a database that is local to the metalworking lathe. The database may be a component of the memory of the lathe and may also be referred to as a register that stores a listing of the tool stations of the turret of the lathe along with measurements corresponding to the tool stations as well as the measurements associated with the spindle. In other examples, the information may be stored in a remote database and may be accessed by the metalworking lathe via, for example, a wired or wireless network.

At block 606, the process 600 may include receiving second measurements including second dimensions of at least one tool configured to be removably coupled to the one or more tool stations. For example, the second measurements may be acquired by a technician who measures the at least one tool. The second measurements may be received by manual input and utilizing a display of the lathe. In other examples, the second measurements may be received from a remote system via a network.

At block 608, the process 600 may include calibrating first movement parameters of the turret and second movement parameters of at least one tool based at least in part on the first measurements and the second measurements. The first movement parameters of the turret may include, for example, the rotation of the turret and/or the position of the turret relative to the spindle and/or bar stock. The first movement parameters may additionally, or alternatively, include the rotation of the spindle or components thereof. The second movement parameters of the tool may include, for example, the rotation of the tool and/or the position of the tool relative to the spindle and/or bar stock. The calibration may be performed such that, when the tool contacts the object to be cut, the tool is situated in the correct x, z coordinate with respect to the object and so that the rotation of the turret, the tool, and/or the spindle will cause the tool to cut the object at the desired area and with the desired cutting thickness.

At block 610, the process 600 may include causing at least one of the tools to cut an object composed of metal based at least in part on the first movement parameters of the turret and the second movement parameters of the at least one tool. For example, once calibrated, the lathe may be enabled for cutting by, for example, a user of the lathe initiating a lathing operation. Utilizing the movement parameters described herein, the turret may rotate such that the tool to be used to cut the object is positioned in line with the bar stock. The turret and/or the tool may also be moved from a resting position to the bar stock such that the tool comes into contact with the bar stock. Once the turret and tool are in position to cut the object, the spindle and/or the tool may begin to rotate. Rotation of the spindle and/or the tool may cause the tool to cut and/or grind away at the bar stock. Additional tools may also be used, and in these examples, when the first tool has performed the desired cut, the turret may rotate and be positioned such that a second tool is in contact with the bar stock.

At block 612, the process 600 may include periodically receiving, from the sensor, third measurements including third dimensions and third parameters of the one or more tool stations. For example, the sensor may be attached to a moveable arm of the lathe. The memory of the lathe may program the one or more processors of the lathe to cause the arm to move such that the sensor is positioned proximate to one or more components of the lathe and such that the sensor measures the position and operational parameters of the components. The periodic measurement may be based on a predefined schedule or may be based on an amount of use of the lathe.

At block 614, the process 600 may include recalibrating the first movement parameters and the second movement parameters based at least in part on the third measurements. The third measurements may replace and/or supplement the first measurements and may be used to recalibrate the movement parameters to ensured proper operation of the lathe, in some examples without user input.

FIG. 7 illustrates a flow diagram of an example process 700 for metal lathe and tooling calibration. The order in which the operations or steps are described is not intended to be construed as a limitation, and any number of the described operations may be combined in any order and/or in parallel to implement process 700.

At block 702, process 700 may include receiving, from a sensor disposed adjacent to a tool station of a lathe, first data indicating at least one of first dimensions of the tool station or a parameter of operation of the tool station. The sensor may be, for example, a tooling ball that may be moved into proximity of various components of the lathe to measure the components and/or parameters of their operation. The first data may include measurements such as, for example, positional and/or rotational measurements of the turret, the one or more tool stations, a spindle of the lathe, and/or components of the spindle. The first dimensions may include a z-axis distance of the tool station to a carriage and/or spindle configured to hold the object and/or an x-axis distance of the tool station to the carriage and/or spindle. The parameter of operation may include, for example, a first rotational distance of the spindle about a center line of the spindle.

At block 704, the process 700 may include receiving second data indicating second dimensions of a tool configured to be removably coupled to the tool station. For example, the second data may include measurements acquired by a technician who measures the tool. The second data may be received by manual input and utilizing a display of the lathe. In other examples, the second data may be received from a remote system via a network.

At block 706, the process 700 may include calibrating movement parameters of a component of the lathe based at least in part on the first data and the second data. The movement parameters of the component may include, for example, the rotation of the turret and/or the position of the turret relative to the spindle and/or bar stock. The movement parameters may additionally, or alternatively, include the rotation of the spindle or components thereof. The calibration may be performed such that, when the tool contacts the object to be cut, the tool is situated in the correct x, z coordinate with respect to the object and so that the rotation of the turret, the tool, and/or the spindle will cause the tool to cut the object at the desired area and with the desired cutting thickness.

At block 708, the process 700 may include assigning a second tool station as a reference station. For example, the dimensions and/or operational parameters of one or more tool stations of the turret may be used as a reference point from which dimensions and/or operational parameters of one or more other tool stations may be based. In some examples, the second tool station may be a tool station that is not used during the tooling of an object.

At block 710, the process 700 may include designating third data indicating dimensions and parameters of the second tool station as reference data. The reference data may be compared to the dimensions and/or parameters of the other tool stations to determine how the movement parameters of the turret, tool station, tool, and/or spindle should be calibrated to tool the object correctly. At block 712, the process 700 may include calibrating movement parameters associated with the first tool station based at least in part on the reference data.

At block 714, the process 700 may include causing a tool to machine an object based at least in part on the movement parameters of the component and/or movement parameters of the first tool station. For example, once calibrated, the lathe may be enabled for cutting by, for example, a user of the lathe initiating a lathing operation. Utilizing the movement parameters described herein, the turret may rotate such that the tool to be used to cut the object is positioned in line with the bar stock. The turret and/or the tool may also be moved from a resting position to the bar stock such that the tool comes into contact with the bar stock. Once the turret and tool are in position to cut the object, the spindle and/or the tool may begin to rotate. Rotation of the spindle and/or the tool may cause the tool to cut and/or grind away at the bar stock. Additional tools may also be used, and in these examples, when the first tool has performed the desired cut, the turret may rotate and be positioned such that a second tool is in contact with the bar stock.

At block 716, the process 700 may include periodically receiving, from the sensor, third data corresponding to third dimensions and third parameters of the tool station. The memory of the lathe may program the one or more processors of the lathe to cause the sensor to move proximate to one or more components of the lathe and such that the sensor measures the position and operational parameters of the components. The periodic measurement may be based on a predefined schedule or may be based on an amount of use of the lathe.

At block 718 the process 700 may include recalibrating the movement parameters based at least in part on the third data. The third data may replace and/or supplement the first data and may be used to recalibrate the movement parameters to ensured proper operation of the lathe, in some examples without user input.

FIG. 8 illustrates a flow diagram of an example process 800 for metal lathe and tooling calibration. The order in which the operations or steps are described is not intended to be construed as a limitation, and any number of the described operations may be combined in any order and/or in parallel to implement process 800.

At block 802, the process 800 may include receiving, from a sensor disposed adjacent to a first tool station, first measurements including first dimensions of the first tool station and first parameters of operation of the first tool station. The sensor may be, for example, a tooling ball that may be moved into proximity of various components of the lathe to measure the components and/or parameters of their operation. The first measurements may include measurements such as, for example, positional and/or rotational measurements of the first tool station. The first tool station may be configured, for example, to hold one or more tools.

At block 804, the process 800 may include receiving, from the sensor disposed adjacent to the second tool station, second measurements including second dimensions of the second tool station and second parameters of operation of the second tool station. The sensor may be a tooling ball, as described with respect to block 802. The second measurements may include measurements such as positional and/or rotational measurements of the second tool station. The first and second measurements may include, for example, a z-axis distance of the tool station to a carriage and/or spindle configured to hold the object, a x-axis distance of the tool station to the carriage, a first rotational distance of a face of the spindle about a center line of the spindle, a second rotational distance of a rim of the spindle about the center line of the spindle, and/or a third rational distance of a bore of the spindle about the center line of the spindle.

At block 806, the process 800 may include receiving third measurements corresponding to third dimensions of a first tool. For example, the third measurements may include measurements acquired by a technician who measures the first tool. The third measurements may be received by manual input and utilizing a display of the lathe. In other examples, the third measurements may be received from a remote system via a network.

At block 808, the process 800 may include receiving fourth measurements corresponding to fourth dimensions of a second tool. For example, the fourth measurements may include measurements acquired by a technician who measures the second tool. The fourth measurements may be received by manual input and utilizing a display of the lathe. In other examples, the fourth measurements may be received from a remote system via a network.

At block 810, the process 800 may include calibrating first movement parameters of a turret and the first tool station based at least in part on the first measurements and the third measurements. The first movement parameters of the turret may include, for example, the rotation of the turret and/or the position of the turret relative to the spindle and/or bar stock. The first movement parameters may additionally, or alternatively, include the rotation of the spindle or components thereof. The movement parameters of the first tool may include, for example, the rotation of the tool and/or the position of the tool relative to the spindle and/or bar stock. The calibration may be performed such that, when the first tool contacts the object to be cut, the tool is situated in the correct x, z coordinate with respect to the object and so that the rotation of the turret, the tool, and/or the spindle will cause the tool to cut the object at the desired area and with the desired cutting thickness.

At block 812, the process 800 may include calibrating second movement parameters of the turret and the second tool station based at least in part on the second measurements and the fourth measurements. The second movement parameters of the turret may include, for example, the rotation of the turret and/or the position of the turret relative to the spindle and/or bar stock. The second movement parameters may additionally, or alternatively, include the rotation of the spindle or components thereof. The movement parameters of the second tool may include, for example, the rotation of the tool and/or the position of the tool relative to the spindle and/or bar stock. The calibration may be performed such that, when the second tool contacts the object to be cut, the tool is situated in the correct x, z coordinate with respect to the object and so that the rotation of the turret, the tool, and/or the spindle will cause the tool to cut the object at the desired area and with the desired cutting thickness.

At block 814, the process 800 may include causing the first tool to cut an object composed of metal based at least in part on the first movement parameters. For example, once calibrated, the lathe may be enabled for cutting by, for example, a user of the lathe initiating a lathing operation. Utilizing the movement parameters described herein, the turret may rotate such that the first tool to be used to cut the object is in line with the bar stock. The turret and/or the first tool may also be moved from a resting position to the bar stock such that the first tool comes into contact with the bar stock. Once the turret and first tool are in position to cut the object, the spindle and/or the first tool may begin to rotate. Rotation of the spindle and/or the first tool may cause the first tool cut and/or grind away at the bar stock.

At block 816, the process 800 may include causing the second tool to cut the object based at least in part on the second movement parameters. For example, once calibrated, the lathe may be enabled for cutting by, for example, a user of the lathe initiating a lathing operation. Utilizing the movement parameters described herein, the turret may rotate such that the second tool to be used to cut the object is in line with the bar stock. The turret and/or the second tool may also be moved from a resting position to the bar stock such that the second tool comes into contact with the bar stock. Once the turret and second tool are in position to cut the object, the spindle and/or the second tool may begin to rotate. Rotation of the spindle and/or the second tool may cause the second tool cut and/or grind away at the bar stock. Additional tools may also be used, and in these examples, when the first tool has performed the desired cut, the turret may rotate and be positioned such that a second tool is in contact with the bar stock.

The process 800 may additionally include receiving an indication that the first tool is replaced by a third tool. The process 800 may include receiving measurements including dimensions and parameters of operation of the third tool and recalibrating the first movement parameters based at least in part on the first measurements and the new measurements corresponding to the third tool. Once recalibrated, the third tool may be utilized to cut the object or another object based at least in part on the first movement parameters, as recalibrated.

The process 800 may additionally include assigning a tool station as a reference station. For example, the dimensions and/or operational parameters of one or more tool stations of the turret may be used as a reference point from which dimensions and/or operational parameters of one or more other tool stations may be based. In some examples, the tool station may be a tool station that is not used during the tooling of an object. The process 800 may include designating data indicating dimensions and parameters of the reference tool station as reference data. The reference data may be compared to the dimensions and/or parameters of the other tool stations to determine how the movement parameters of the turret, tool station, tool, and/or spindle should be calibrated to tool the object correctly. The process 800 may include calibrating movement parameters associated with the tool stations based at least in part on the reference data.

The process 800 may additionally include presenting, on a screen associated with the lathe, a prompt to confirm initiation of operation of the lathe without requesting additional information or input from a user. The process 800 may include causing the first tool and the second tool to cut the object based at least in part on receiving the indication that initiation of operation of the lathe has been confirmed.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
computer-readable media storing computer-executable instructions that, when executed by the one or more processors, cause the one or more processors to perform operations comprising:
receiving, from a sensor disposed adjacent to a turret of a metalworking lathe:
first dimensions of one or more tool stations of the turret, the first dimensions including at least one of a z-axis distance of the one or more tool stations to a carriage configured to hold an object or an x-axis distance of the one or more tool stations to the carriage; and
operational parameters of the one or more tool stations;
storing, in a database local to the metalworking lathe, the first dimensions and the operational parameters;
receiving second dimensions of at least one tool configured to be removably coupled to the one or more tool stations;
calibrating first movement parameters of the turret and second movement parameters of the at least one tool based on the first dimensions, the operational parameters, and the second dimensions, wherein:
the first movement parameters include at least one of a rotational position of the turret on the metalworking lathe, a location of the turret relative to the carriage, or a location of the turret relative to the object, and
the second movement parameters include at least one of a position of the at least one tool within the turret or a location of the at least one tool relative to the object; and
causing the at least one tool to cut the object composed of metal based on the first movement parameters and the second movement parameters.

2. The system of claim 1, wherein the sensor utilizes a tooling ball to generate the first dimensions and the operational parameters.

3. The system of claim 1, wherein the operational parameters comprise first operational parameters, and the operations further comprising:
periodically receiving, from the sensor, third dimensions of the one or more tool stations and second operational parameters of the one or more tool stations; and
recalibrating the first movement parameters and the second movement parameters based on the third dimensions and the second operational parameters.

4. The system of claim 1, wherein at least one of the one or more tool stations is configured to hold multiple tools.

5. One or more computer-readable media storing computer-executable instructions that, when executed by one or more processors, cause the one or more processors to perform operations comprising:
receiving, from a sensor disposed adjacent to a tool station of a lathe, first data indicating at least one of:
a first dimension of the tool station, wherein the first dimension includes at least one of a z-axis distance of the tool station to a carriage configured to hold the object or an x-axis distance of the tool station to the carriage; or
an operational parameter of the tool station;
receiving second data indicating a second dimension of a tool configured to be removably coupled to the tool station;
calibrating movement parameters of a component of the lathe based on the first data and the second data, the movement parameters including at least one of a location of the tool station relative to the object or a location of the tool relative to the object; and
causing the tool to machine the object based on the movement parameters of the component.

6. The computer-readable media of claim 5, wherein the sensor utilizes a tooling ball to generate the first data.

7. The computer-readable media of claim 5, wherein the tool station comprises a first tool station, the operational parameter comprises a first operational parameter, and calibrating the movement parameters of the component comprises:
assigning a second tool station of the lathe as a reference station;
receiving third data indicating a third dimension of the second tool station and a second operational parameter of the second tool station;
designating the third data as reference data; and
calibrating the movement parameters associated with the first tool station based on the reference data.

8. The computer-readable media of claim 5, wherein the operational parameter comprises a first operational parameter, the operations further comprising:
- periodically receiving, from the sensor, third data corresponding to a third dimension of the tool station and a second operational parameter of the tool station; and
- recalibrating the movement parameters based on the third data.

9. The computer-readable media of claim 5, wherein the operational parameter includes a first rotational distance of a spindle of the tool station about a center line of the spindle.

10. The computer-readable media of claim 5, wherein the second data is received via a wired or wireless network connection from a remote system.

11. The computer-readable media of claim 5, wherein the tool comprises a first tool, the object comprises a first object, and the operations further comprising:
- receiving third data indicating a third dimension of a second tool configured to be removably coupled to the tool station;
- recalibrating the movement parameters of the component of the lathe based on the first data and the third data; and
- causing the second tool to machine a second object based on the movement parameters, as recalibrated, of the component.

* * * * *